Figure 1:
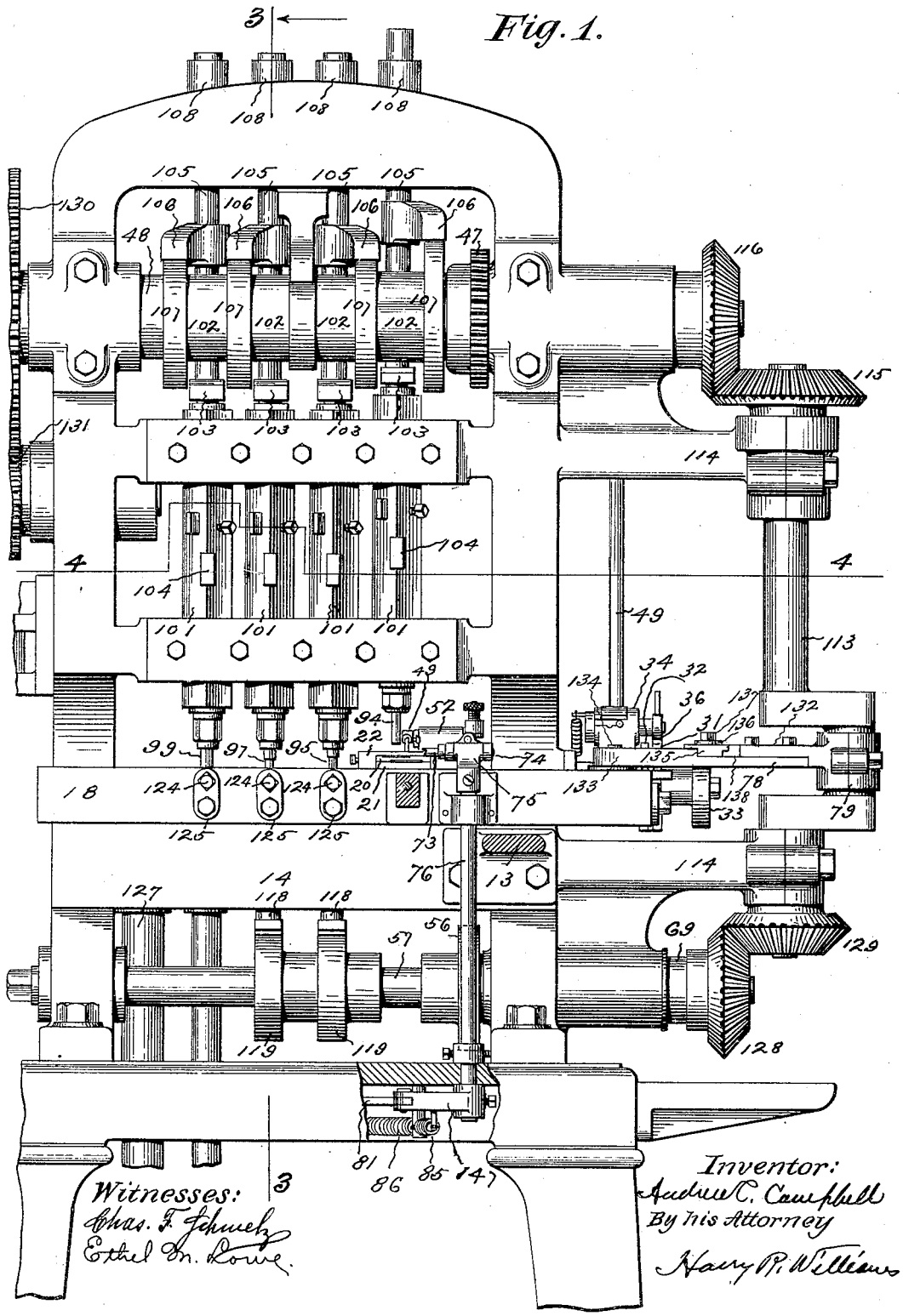

No. 768,876. PATENTED AUG. 30, 1904.
A. C. CAMPBELL.
EYELET MACHINE.
APPLICATION FILED JAN. 11, 1904.
NO MODEL. 10 SHEETS—SHEET 1.

Witnesses:
Chas. F. Schmelz
Ethel M. Lowe

Inventor:
Andrew C. Campbell
By his Attorney
Harry R. Williams

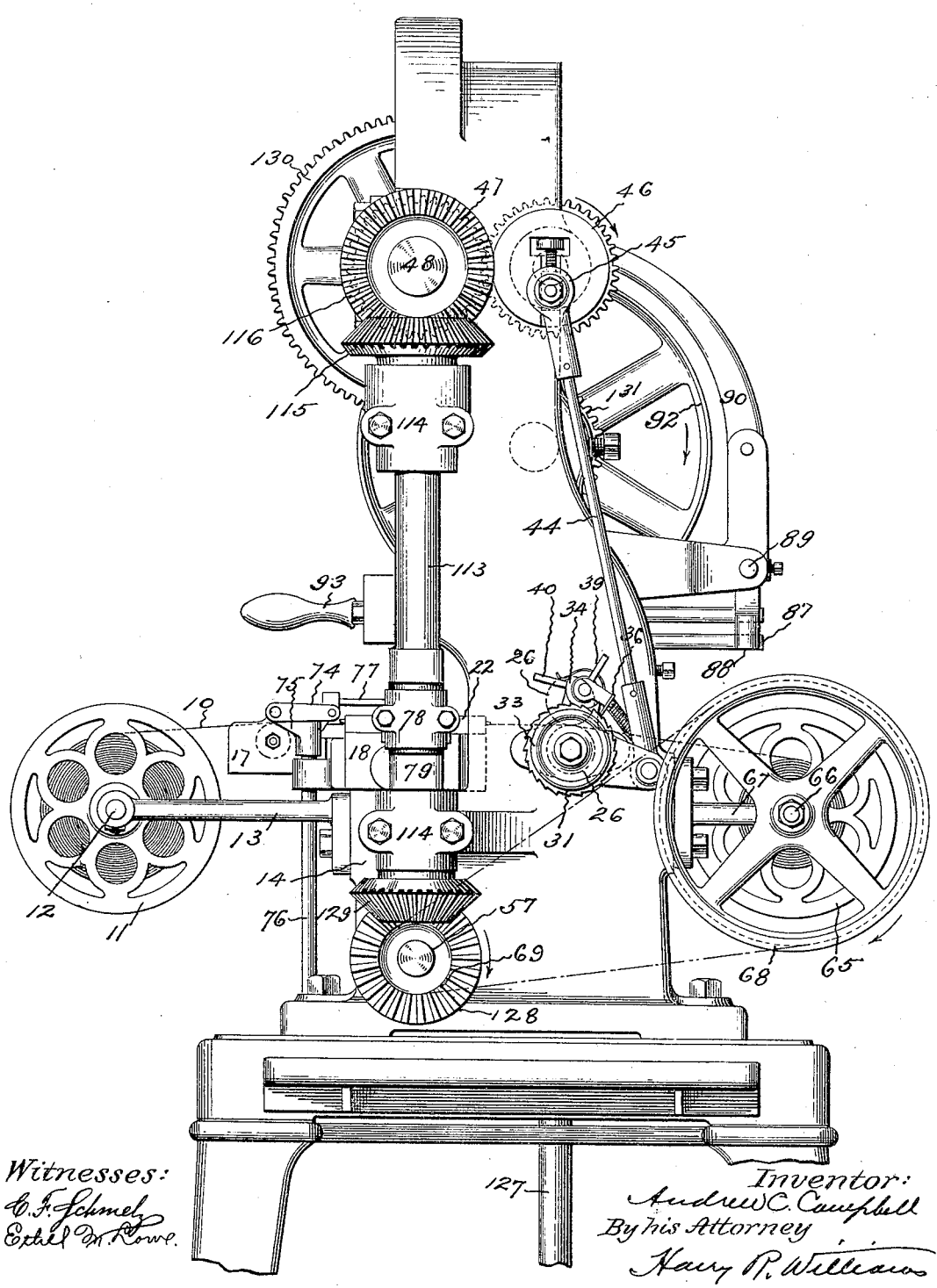

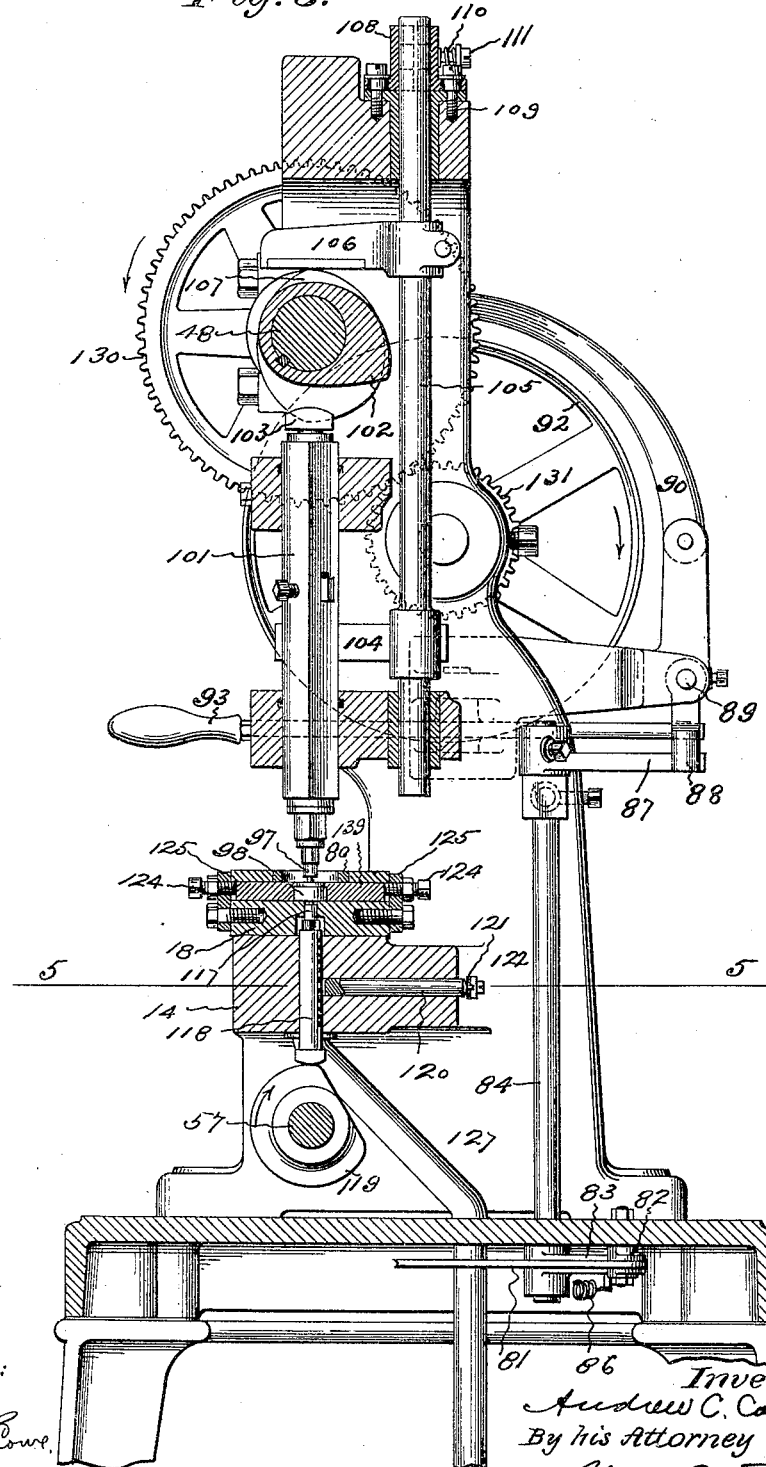

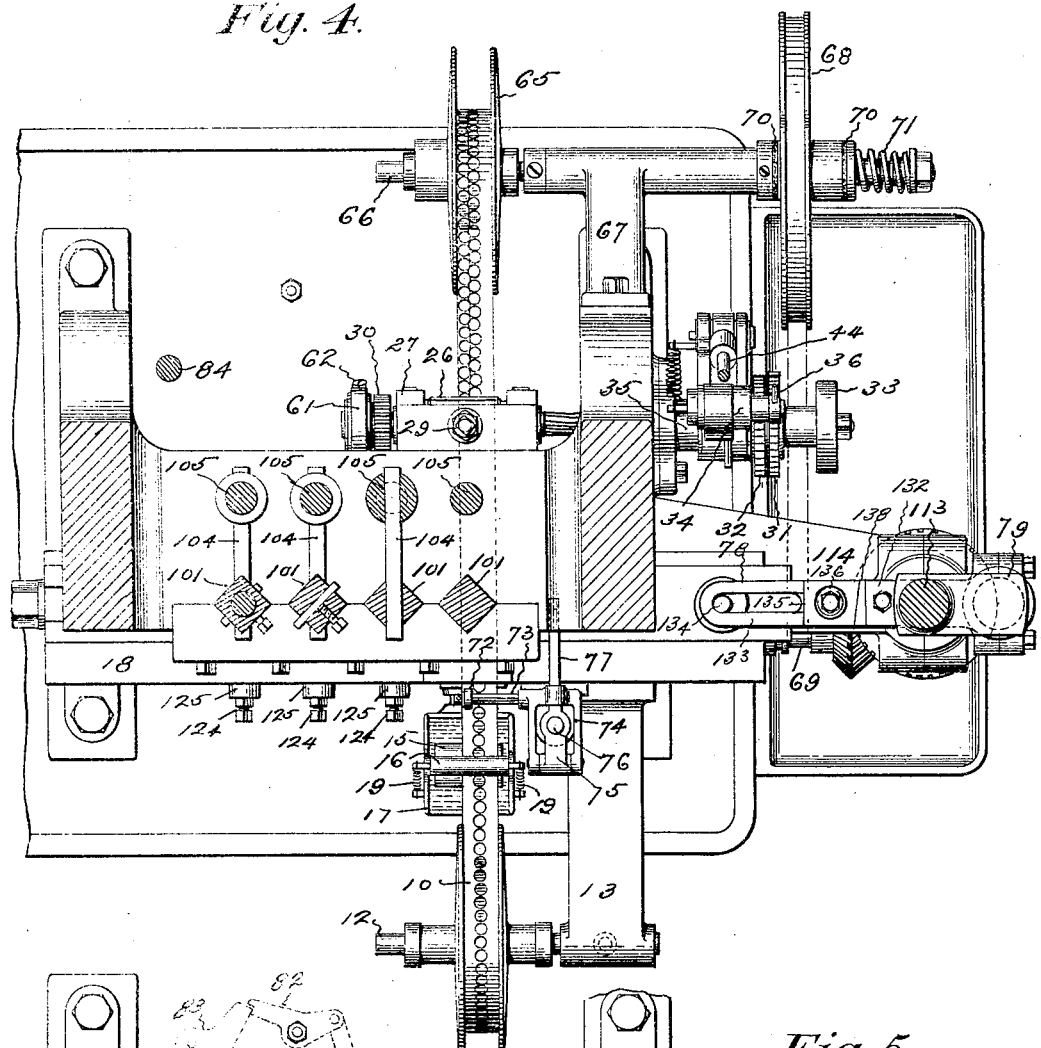

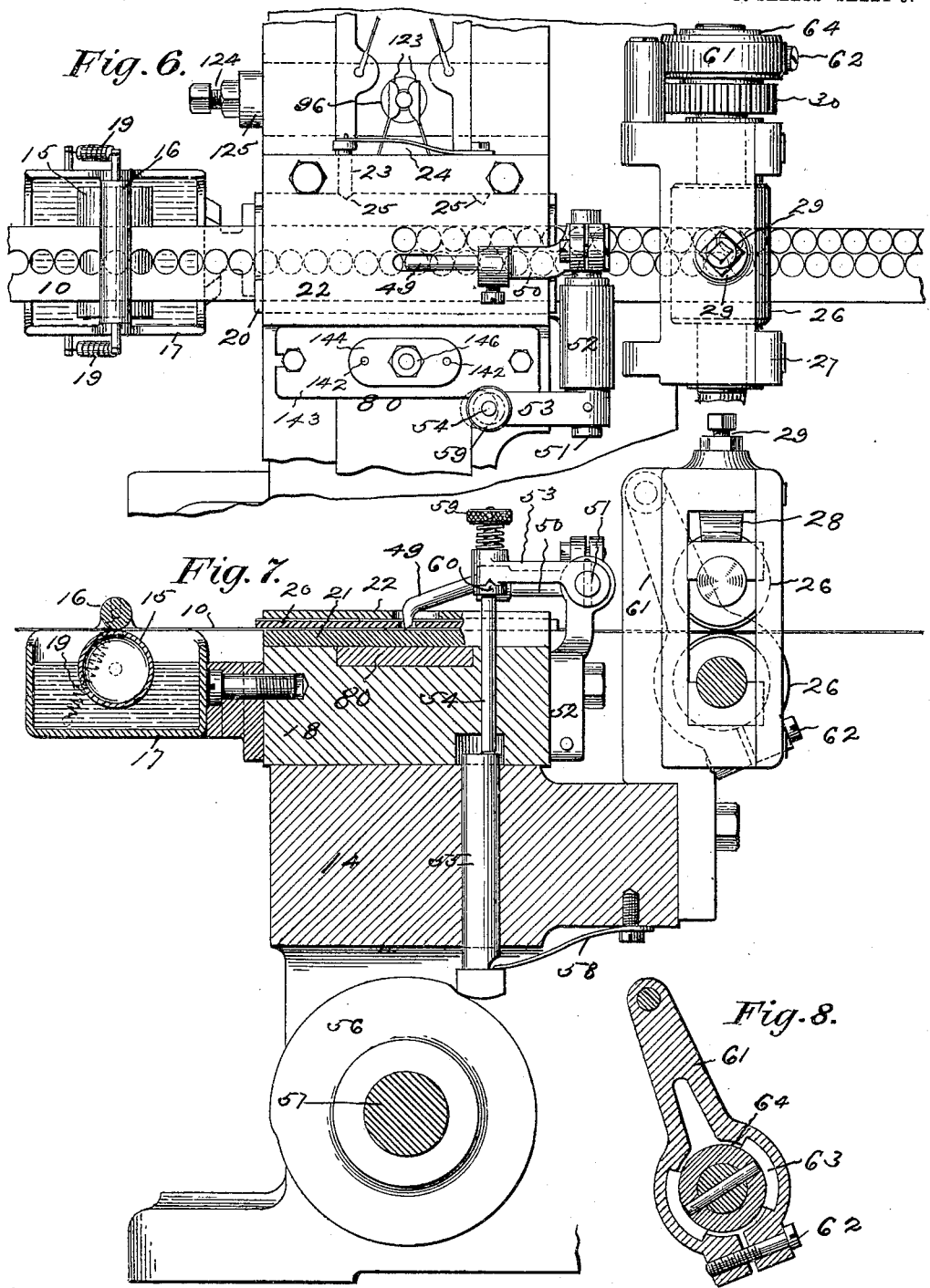

No. 768,876. PATENTED AUG. 30, 1904.
A. C. CAMPBELL.
EYELET MACHINE.
APPLICATION FILED JAN. 11, 1904.
NO MODEL. 10 SHEETS—SHEET 6.
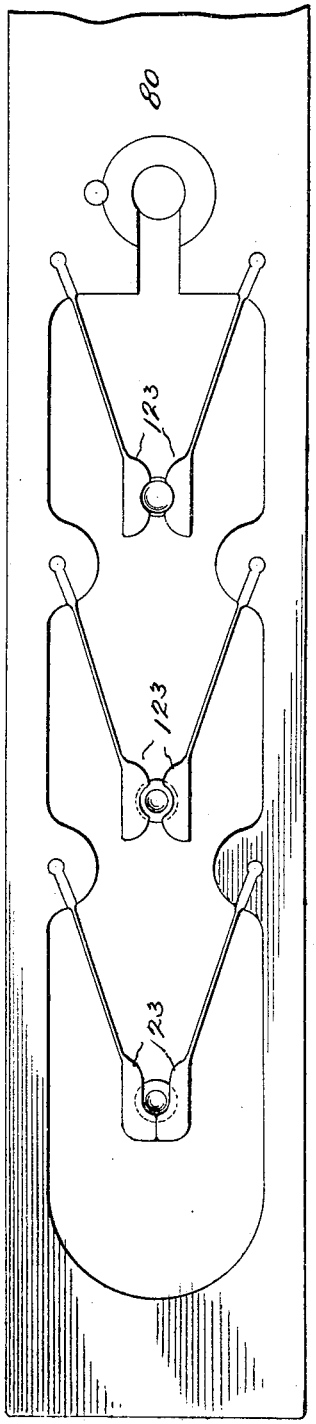
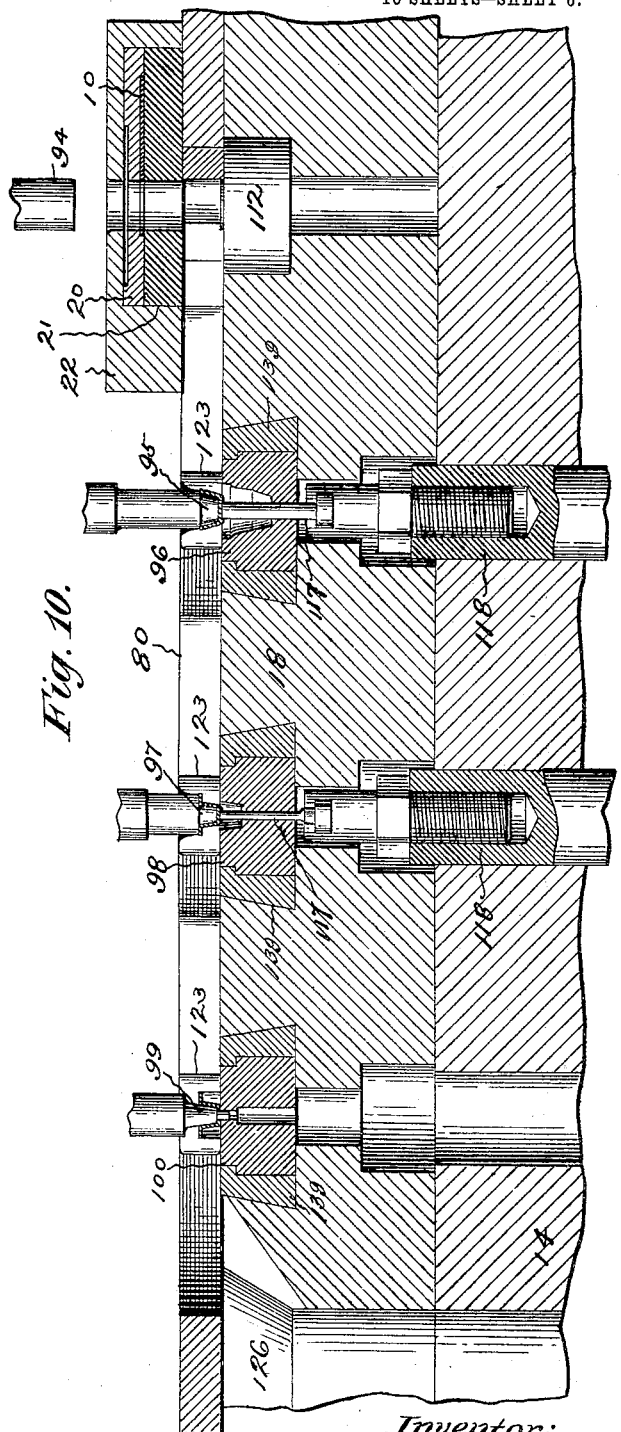
Witnesses:
Chas. F. Schmelz
Ethel M. Lowe
Inventor:
Andrew C. Campbell
By his Attorney
Harry P. Williams No. 768,876. PATENTED AUG. 30, 1904.
A. C. CAMPBELL.
EYELET MACHINE.
APPLICATION FILED JAN. 11, 1904.
NO MODEL. 10 SHEETS—SHEET 7.
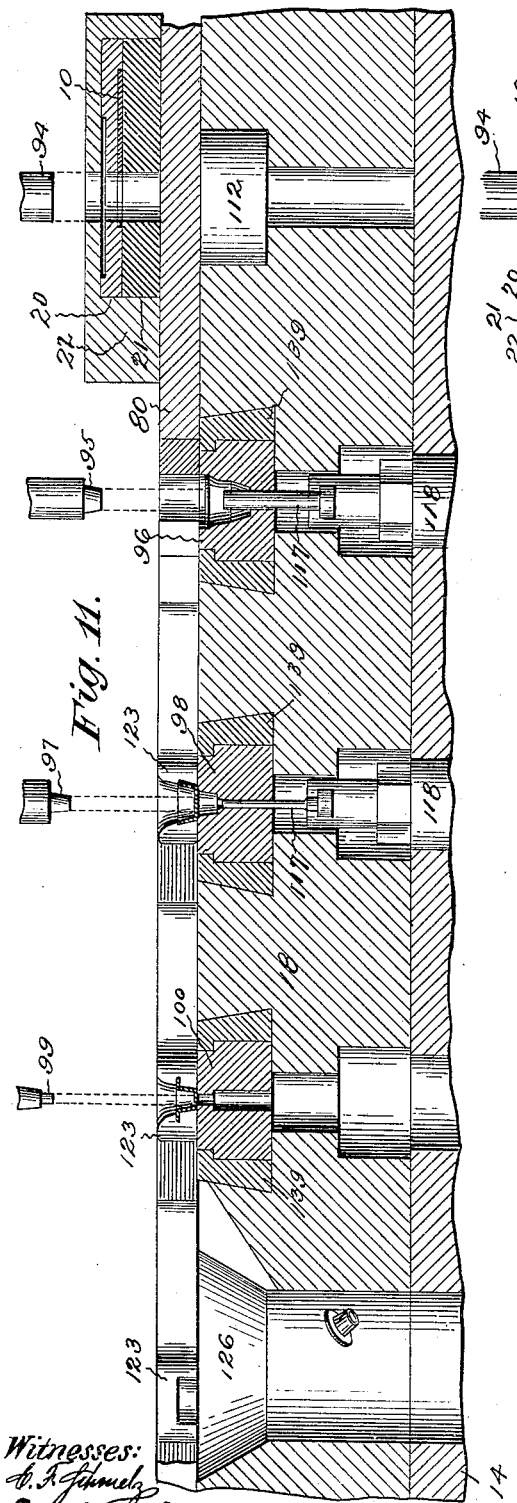
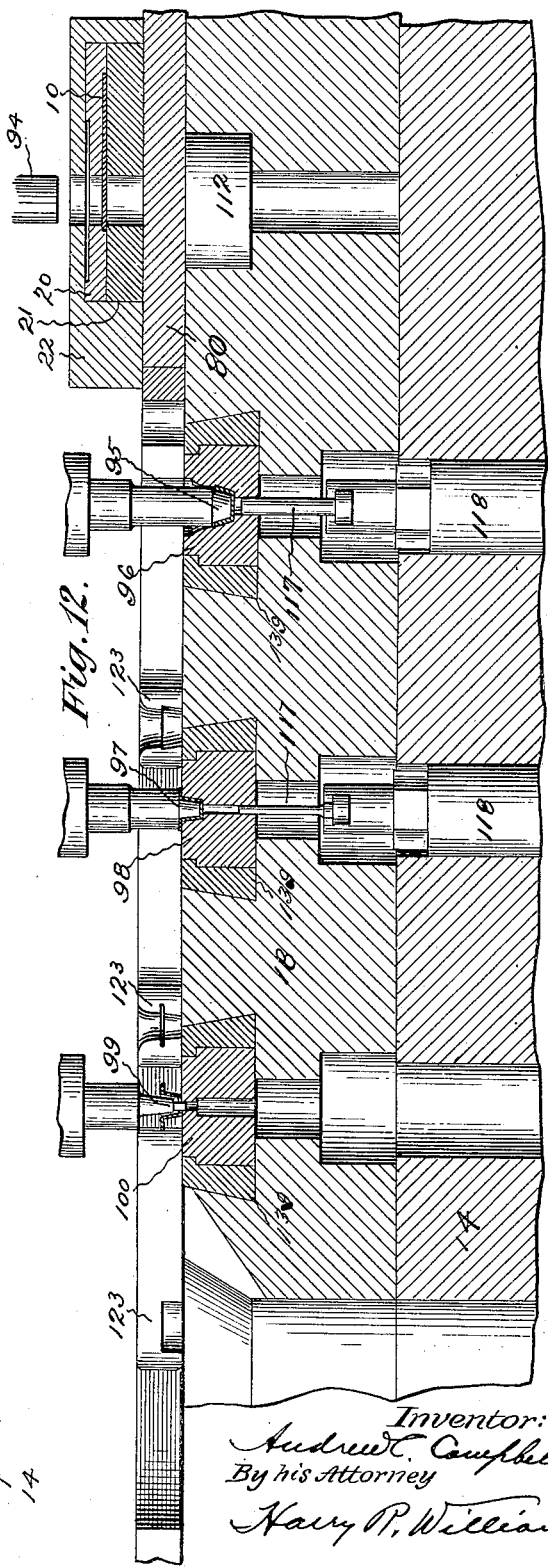

No. 768,876. PATENTED AUG. 30, 1904.
A. C. CAMPBELL.
EYELET MACHINE.
APPLICATION FILED JAN. 11, 1904.
NO MODEL. 10 SHEETS—SHEET 8.
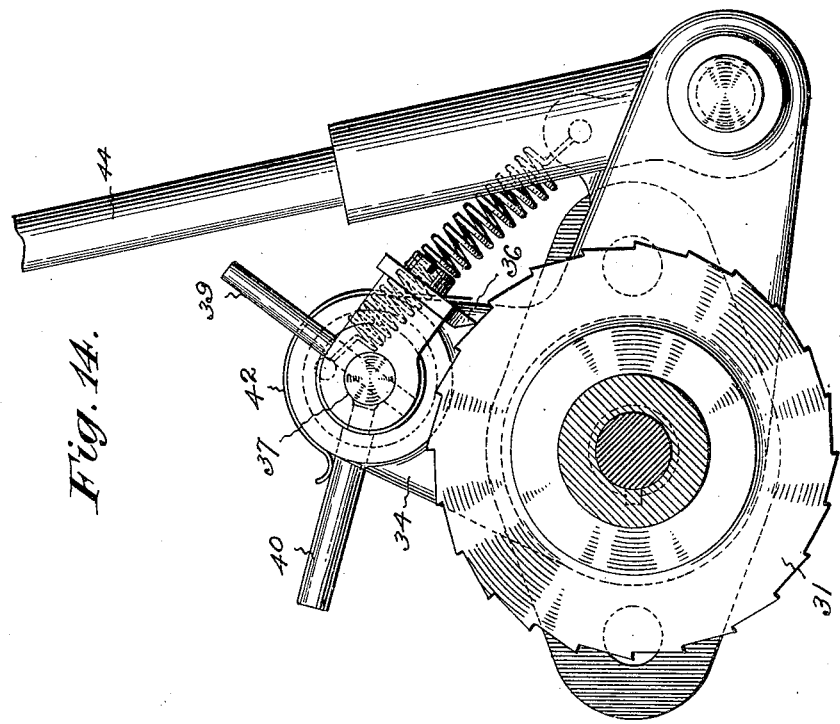
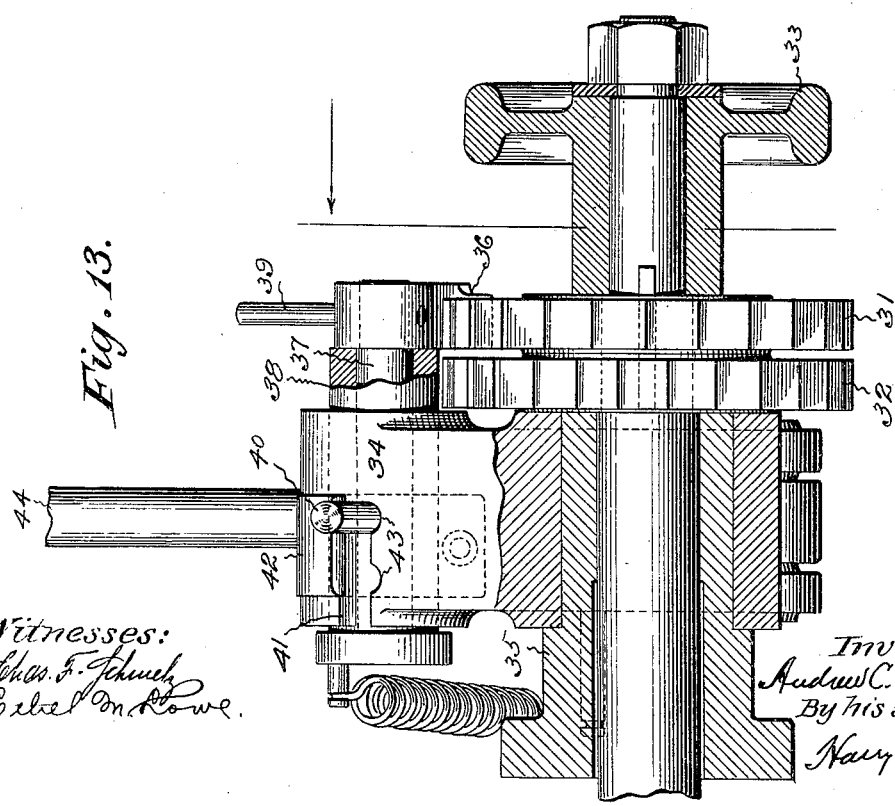

No. 768,876. PATENTED AUG. 30, 1904.
A. C. CAMPBELL.
EYELET MACHINE.
APPLICATION FILED JAN. 11, 1904.
NO MODEL. 10 SHEETS—SHEET 9.

Witnesses:
Chas. F. Schwelz
Ethel M. Rowe

Inventor:
Andrew C. Campbell
By his Attorney
Harry R. Williams

No. 768,876. PATENTED AUG. 30, 1904.
A. C. CAMPBELL.
EYELET MACHINE.
APPLICATION FILED JAN. 11, 1904.
NO MODEL. 10 SHEETS—SHEET 10.
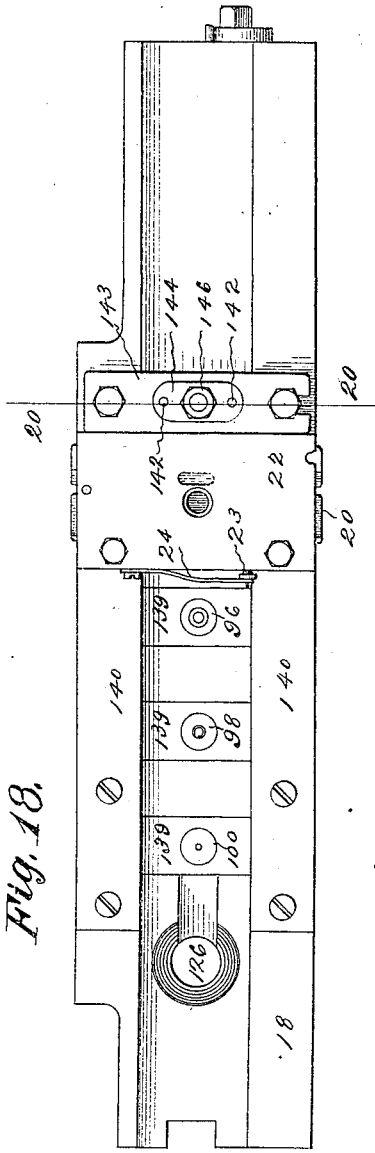
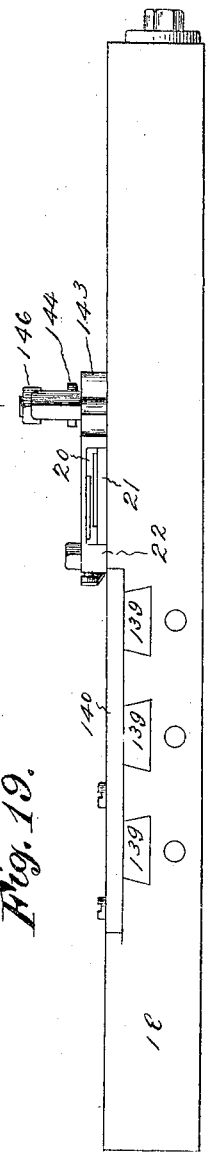
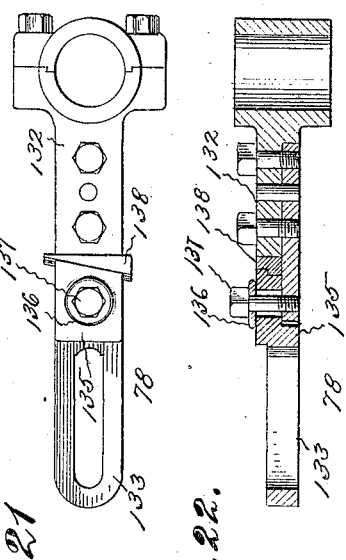
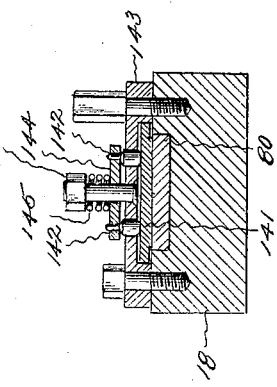
Witnesses:
Ethel M. Lowe.
Inventor:
Andrew C. Campbell,
By his Attorney
Harry R. Williams No. 768,876.                                    Patented August 30, 1904.

UNITED STATES PATENT OFFICE.

ANDREW C. CAMPBELL, OF WATERBURY, CONNECTICUT, ASSIGNOR TO THE E. J. MANVILLE MACHINE COMPANY, OF WATERBURY, CONNECTICUT, A CORPORATION OF CONNECTICUT.

EYELET-MACHINE.

SPECIFICATION forming part of Letters Patent No. 768,876, dated August 30, 1904.

Application filed January 11, 1904. Serial No. 188,660. (No model.)

*To all whom it may concern:*

Be it known that I, ANDREW C. CAMPBELL, a citizen of the United States, residing at Waterbury, in the county of New Haven and State of Connecticut, have invented certain new and useful Improvements in Eyelet-Machines, of which the following is a specification.

This invention relates to a machine which automatically feeds a strip of sheet-metal and punches blanks from the strip and forms eyelets from blanks.

The object of the invention is to simplify the construction of such a machine and to so design the mechanisms that they will cut accurate blanks and form perfect eyelets as long as a strip is fed to them, but will stop as soon as the end of the strip has been reached.

With the machine shown in the accompanying drawings a strip of thin metal is fed from front to back through a guide and the blanks punched from the middle of the strip. After the blanks have been punched from the middle the guide is turned over end for end and the strip again fed through and blanks punched from one side of the middle. Then the strip is reversed and again fed through the guide and blanks punched from the other side of the middle. Each blank is transferred sidewise of the machine and successively punched by several punches and dies, which give the various shapes necessary to produce the final form. The feed mechanism is so arranged that the amount of feed of the strip when the blanks are punched from the side is controlled by the location of the holes made when the blanks are punched from the middle, and thus perfect blanks are insured, and when the end of the strip is reached the mechanisms stop acting. The machine shown has three punches and dies besides the blanking punch and die. However, the invention is applicable to a machine having a greater or less number of punches and dies.

Figure 15:
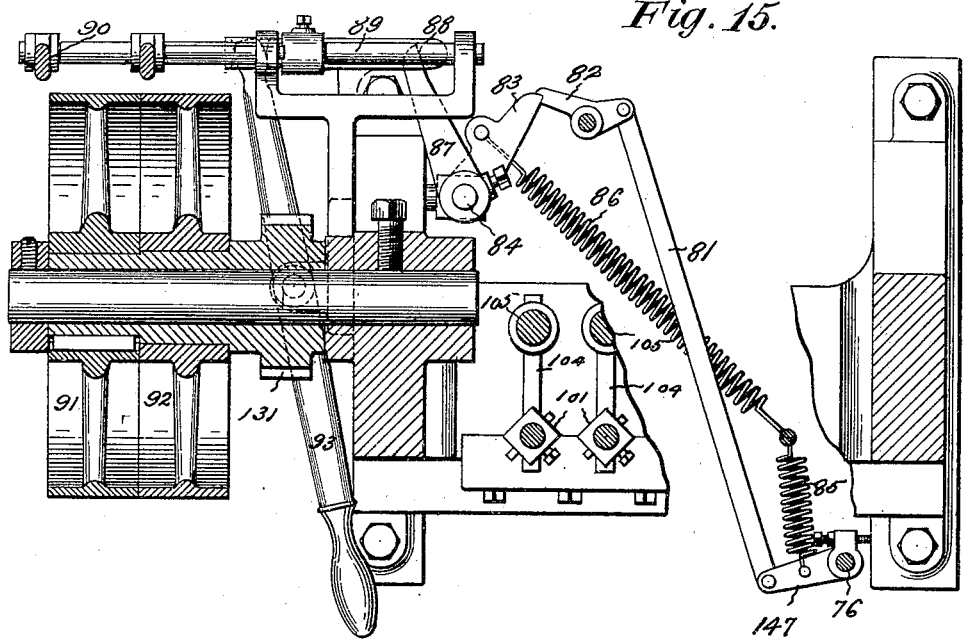
Figure 16:
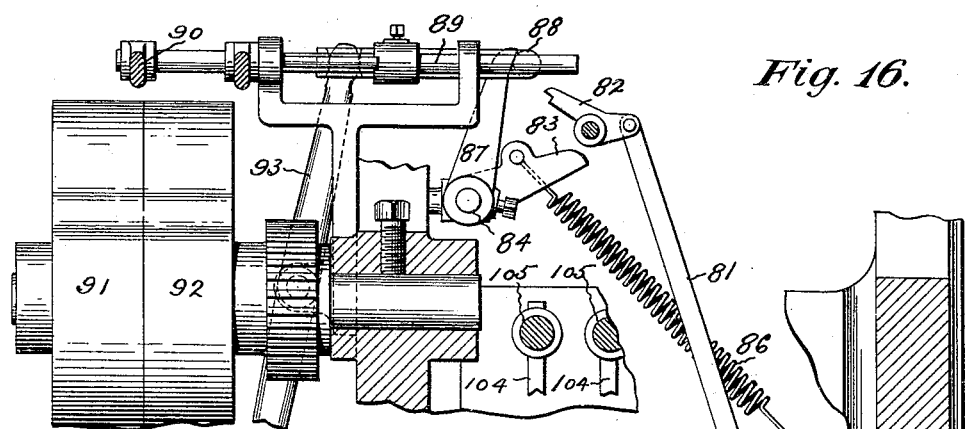
Figure 17:
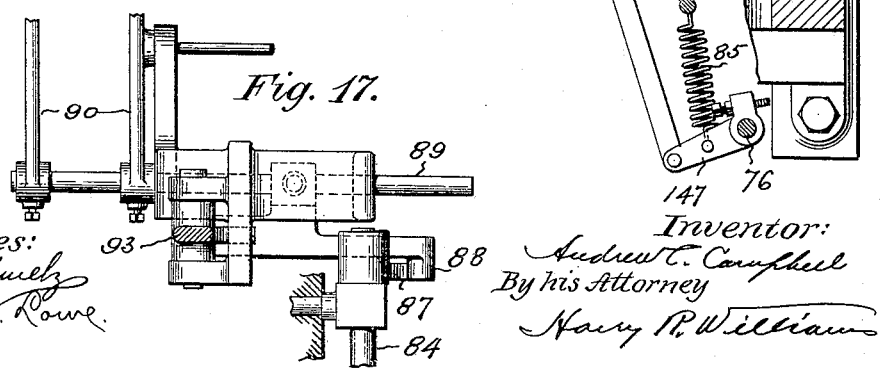

Figure 1 of the views shows a front elevation of the entire machine except a part of the mechanism on the left-hand side. Fig. 2 shows a side elevation. Fig. 3 shows a vertical section on the plane indicated by the line 3 3 of Fig. 1. Fig. 4 shows a horizontal section on the plane indicated by the line 4 4 of Fig. 1. Fig. 5 shows a horizonal section of the frame with a portion cut away on the plane indicated by the line 5 5 of Fig. 3. Fig. 6 shows a strip being fed through the guide above the blanking-die. Fig. 7 shows an elevation, with part in section, of the parts shown in Fig. 6. Fig. 8 shows the feed-roll friction. Fig. 9 shows a plan of the transfer-slide. Fig. 10 shows a vertical section through the die-bed and dies, with the punches in the positions occupied after the pieces that have been shaped are carried up into the grasp of the fingers of the slide. Fig. 11 shows a section of the die-bed and dies with the punches in the positions occupied after the slide has transferred the blanks for the next operations. Fig. 12 shows a sectional view of the die-bed and dies with the punches in the positions occupied when shaping the blanks. Fig. 13 shows an elevation of a part of the feed mechanism. Fig. 14 shows a side elevation of this part of the feed mechanism. Fig. 15 shows a plan of the belt-shifting mechanism in the position occupied when the machine is running. Fig. 16 shows a plan of the belt-shifting mechanism in the position occupied when the machine is stopped. Fig. 17 shows an elevation of a portion of the belt-shifting mechanism. Fig. 18 shows a plan of the die-bed, dies, channel-plate, and slide-holder with the transfer-ring-slide omitted. Fig. 19 shows an edge view of the same. Fig. 20 shows a section through the die-bed and slide-holder on the plane indicated by the line 20 20 of Fig. 18. Fig. 21 shows a plan of the crank-rod. Fig. 22 shows a section of the crank-rod.

The strip 10, from which the blanks are punched, is wound upon a supply-reel 11, that is loose upon a spindle 12, held by a bracket 13, that is bolted to the front of the frame 14, Figs. 2, 4. The strip passes from the supply-reel between a cylinder 15 and a roller 16 in an oil-box 17, that is bolted to the front of the die-bed 18. The roller is drawn downwardly by springs 19 so as to hold the strip against the cylinder, which applies a small quantity of oil to the surface of the strip as it feeds, Figs. 4, 6, 7. The strip then passes through a groove in a guide-plate 20 above the blanking-die 21. The guide-plate and the blanking-die are held in position by a channel-plate 22, that is fastened to the top of the die-bed. A plunger 23 in an opening in the side of the channel-plate is thrust by a spring 24 into a notch 25 in the edge of the guide-plate for retaining it in position. The guide-plate has a groove for the strip in both of its faces, one groove being nearer one edge and the other groove being nearer the other edge. When the guide-plate is inserted with one groove down, the strip is so guided that blanks are punched from the middle. If the guide is turned over end for end and the other groove is down, the strip is guided so that blanks are punched from one side of the middle. Then if the strip is passed through in the reverse direction blanks are punched from the other side of the middle, Figs. 6, 10, 11, 12. The strip is drawn through the machine by feed-rolls 26, mounted on boxes held by a yoke 27, that is bolted to the back of the frame. The pressure of the upper roll upon the lower is determined by the tension of the spring 28, which bears upon the boxes and is forced down by a screw-bolt 29, Figs. 6, 7.

The shafts of the feed-rolls have intermeshing gears 30 at one side of the yoke, and the shaft of the lower roll has outside of the frame two ratchet-wheels arranged side by side, one, 31, having a few more teeth than the other, 32. The shaft of the lower ratchet-wheel also has a hand-wheel 33, which can be grasped and turned by hand for rotating the feed-rolls and drawing a strip into the machine on the start, Figs. 1, 2, 13, and 14.

A pawl-block 34 is mounted upon the hub 35, that is bolted to the side of the frame and supports the outer end of the shaft of the lower feed-roll. The pawl-block carries a pawl 36, which is fastened to the end of the arbor 37, that extends through a bushing 38, which is movable longitudinally in the block, so that the pawl may be engaged with either one or the other of the ratchet-wheels. The pawl is provided with a pin 39, by means of which it can be turned over out of engagement with the teeth of the ratchet-wheels, and the bushing is provided with a pin 40, by means of which it may be moved longitudinally for transferring the pawl. The bushing-pin extends through a slot 41 in the pawl-block and is held by a spring 42 in either one or the other of the retaining-notches 43, formed in the edge of the slot. When the pin is lifted against the spring, it may be moved longitudinally from one notch to the other for the purpose of moving the pawl from one ratchet-wheel to the other, Figs. 2, 4, 13, 14.

The pawl-block is connected by a rod 44 with an adjustable crank 45, that is mounted on a shaft provided with a gear 46, which meshes with a gear 47 on the main cam-shaft 48, Figs. 2, 14. When the crank is rotated, the pawl is oscillated and the ratchet-wheels given an intermittent rotation, which causes the feed-rolls to draw the strip through the machine.

When the blanks are punched from the middle of the strip, the pawl is engaged with the ratchet-wheel having the larger number of teeth, which gives the correct feed, so that the punchings will just clear each other. When the blanks are to be punched from either side of the middle, the pawl is moved so as to engage with the ratchet-wheel having the smaller number of teeth, which tends to cause the feed-rolls to draw the strip a little more than necessary each time. This is for the purpose of surely feeding the strip such a distance that the side punchings will be made exactly intermediate of the middle punchings and perfect blanks be formed. A stop-finger is caused to drop into a middle hole near the place to be punched, so that the position of each side punching is determined by the position of the middle punching. The stop-finger 49 is fastened to an arm 50, that is clamped to an arbor 51, held by a bracket 52, bolted to the back of the die-bed. This finger is arranged to drop downwardly through an opening in the channel-plate and in the guide-plate into the middle holes. An arm 53 is fastened to the finger-arbor, and supported by this arm is a rod 54, which is engaged by a plunger 55, that is arranged to be lifted at the proper time by a cam 56 on the lower cam-shaft 57. The plunger is held down by a spring 58. The plunger and rod are lifted by the cam at each revolution of the shaft. When the middle holes are being punched, the rod is turned by means of the handle 59, so that the lug 60 will move out of its notch and lift the arm, and consequently raise the stop-finger. With the parts in this position the stop-finger does not drop down as far as the strip that is being fed through. The cam is timed and the handle is turned so that the stop-finger will drop down into the middle hole at each feed of the strip for making a side punching. As the feed-rolls at this time are being moved by the pawl which engages the ratchet-wheel having the smaller number of teeth, the strip is pulled until the edge of the middle perforation engages the edge of the finger and the strip is stopped. Then the feed-rolls slip on the strip, Figs. 6, 7.

To prevent the rolls from moving backwardly when the pawl is drawn back, a friction-arm 61 is clamped about the shaft of the lower feed-roll. This arm is pivoted to the feed-roll yoke and has a screw 62, which may be tightened or loosened for regulating the grip of the segments 63 upon the sleeve 64, that is secured to the lower feed-roll shaft, Figs. 6, 7, 8.

After passing the feed-rolls the strip is wound upon a winding-reel 65, that is mounted on a spindle 66, which is supported by an arm 67, fastened to the back of the frame. On the reel-spindle is a pulley 68, which is adapted to be belted to a pulley 69 on the lower cam-shaft. The reel-pulley is preferably loosely mounted upon the reel-spindle between two disks 70, the outer of which is thrust toward the pulley by a spring 71. By this arrangement the pulley rotates the reel and slips if the reel tends to wind the strip faster than it is fed through the machine, Figs. 2, 4.

Resting upon the strip between the oil-box and the guide-plate is a roll 72 on a stud 73, projecting from a yoke 74, that is pivoted to an arm 75, fastened to the upper end of a vertical shaft 76. The yoke also has a rearwardly-projecting finger 77. When there is a piece of the strip feeding into the guide-plate, the roll rests on the strip and holds up the yoke and finger. When the end of the strip is reached, the roll drops the yoke, so that the finger moves into the path of the end of the crank-rod 78, that connects the crank 79 with the transfer-slide 80. When this crank-rod strikes the finger, the vertical shaft is turned, Figs. 1, 2, 4.

The crank-rod is formed of two parts bolted together, the part 132 having a bearing for the crank and the part 133 having the slot which contains the stud 134, that projects upwardly from the slide 80. The slide is moved by the engagement of the walls at the ends of the slot with the stud, the length of the slot determining the dwell of the slide in its different positions. The wall at the end of the slot that pushes the slide for transferring the blanks over from one die to the next is formed of a block 135, that is clamped to the part 133 by a plate 136 and a bolt 137. Between this block 135 and the end of the part 132 is a wedge 138, that forms a solid backing for the block. In order to adjust the block so that the end wall will engage the pin at the proper time, the screw is loosened and the wedge moved in or out, as necessary. After the wedge is located in the proper position the screw is set so as to clamp the block, and this also clamps the wedge, Figs. 4, 21, 22.

On the lower end of the vertical shaft 76 is an arm 147, which is connected by a link 81 with a catch 82, that is adapted to engage and hold an arm 83 on the lower end of a vertical shaft 84. A spring 85 is arranged to draw the catch into the path of the arm, and a spring 86 pulls the arm against the catch. When the roll drops and the crank-rod strikes the yoke-finger and turns the shaft, the catch is released, allowing the spring to pull the arm and rotate the vertical shaft 84 at the back of the machine, Figs. 1, 15, 16.

At the upper end of the vertical shaft 84 is an arm 87, which is adapted to engage a hook 88, fastened to a rod 89, that is supported by the frame and carries a belt-shifting fork 90. When the catch is released and this vertical shaft is oscillated, the arm pulls the hook, so that the belt is shifted from the fixed pulley 91 to the loose pulley 92, mounted at one side of the frame, and the machine stops. A lever 93 is arranged for the purpose of moving the belt-shifter by hand. When the shifter is moved by this lever to change the belt from the loose to the fixed pulley, the catch-arm is caused to engage the catch and hold until the catch is released, Figs. 15, 16, 17.

In the machine shown the blanks are cut from the strip by a punch 94 and the die 21, are cupped by the punch 95 and die 96, are flanged by the punch 97 and die 98, and are perforated by the punch 99 and die 100, Figs. 10, 11, 12.

Each of these dies is mounted in a dovetail die-block 139, that is placed in a dovetail groove that extends transversely of the die-bed. Across the ends of these die-blocks extend plates 140, which form guides for the edges of the slide 80, Figs. 10, 11, 18, 19. Each of the die-blocks is adjusted toward the front and back in the die-bed by turning the screws 124, that extend through plates 125, that are bolted to the front and back edges of the die-bed, Figs. 1, 3.

Each punch is fastened to the lower end of a rectangular plunger 101, which is loosely supported by cross-bars of the frame, and each plunger is depressed at the desired time for operating on a blank by the engagement of a cam 102 on the main cam-shaft 48 with the head 103 of the plunger, Figs. 1, 3.

Each plunger is by a bar 104 connected with a round spindle 105, which is supported by the lower cross-bar and the head of the frame. Each spindle has an arm 106 adjustably secured to it, so as to extend forwardly over a lifting-cam 107 on the main cam-shaft, Figs. 1, 3. The upper end of each plunger is surrounded by a sectional sleeve 108, which is held from vertical movement by screws 109, that pass through flanges into the head of the frame, but is allowed a slight lateral movement, as the perforations are larger than the screws. The back section of the sleeve is forced toward the front section by springs 110 on screws 111. This produces a friction for each spindle, so that it remains in its raised position without any side thrust to increase the load or cause wear, Figs. 1, 3.

After the blank has been punched it is left upon the anvil 112 in the path of the slide 80, that is reciprocated by the crank 79. The crank-shaft 113 is supported by brackets 114, extending from the side of the frame, and at its upper end has a beveled gear 115, meshing with a beveled gear 116 on the main cam-shaft, Figs. 1, 2.

The desired amount of friction is applied to the slide 80 by a plate 141, that is forced downwardly by plungers 142, that are loosely mounted in a plate 143, that is bolted to the die-bed across the slide. These plungers are forced downwardly by a plate 144 and a spring 145, that thrusts between the plate and a nut 146. By turning this nut the spring may be made more or less tense and the desired friction obtained, Figs. 18, 20.

Extending into the lower ends of the cupping-die 96 and flanging-die 98 are needles 117, adjustably connected with the upper ends of posts 118, that are adapted to be lifted by cams 119 on the lower cam-shaft 57. These cams lift the blanks up from the dies with the punches. The lifting-posts are engaged by pins 120, that are thrust inwardly from the back by the ends of a spring 121, the tension of which is regulated by a screw 122, Figs. 3 and 5. The slide has spring-fingers 123, which grip the blanks when they are lifted from the dies, Figs. 9, 10. After the fingers have gripped the blanks the slide is moved to transfer them over the next dies. When the blanks are punched, they are pushed from the fingers on the slide, and then the slide is drawn back so that the fingers are ready to strip the following blanks from the punches. After the punches have been drawn up the fingers catch the blanks and the slide is reciprocated so as to transfer the blanks over the dies and beneath the punches next in advance.

The plungers are all alike and supported in the same manner and are connected with similar spindles, which are provided with equivalent frictional devices and lifting-arms. Beneath the last die and punch, which preferably merely make a hole in the bottom of the eyelet, there is no lifter.

After the last operation the fingers of the slide push the completed eyelet which the fingers strip from the punch forward, so that it drops down through an opening 126 in the die-bed into a discharge-tube 127, the fingers preventing the eyelet from lifting, but not from dropping, when moved over the discharge-opening, Figs. 3, 11.

The lower cam-shaft has a bevel-gear 128, which meshes with the beveled gear 129 on the lower end of the vertical crank-shaft 113, that is driven from the main cam-shaft, Figs. 1, 2.

On one end of the main cam-shaft is a gear 130, which meshes with a pinion 131 on the driving-pulley arbor, Figs. 1, 3.

The punches are timed to operate on the blanks and perform their various functions at the same time, and the slide-fingers carry the blanks in different stages of completion from above one die to the die in which the next operation is performed. Fig. 9 shows the slide with blanks held in the spring-fingers. In Fig. 10 the parts are in the positions occupied after the punches and dies have shaped the blanks and the punches are about to be raised from the blanks which are held by fingers on the slide. Fig. 11 shows the blanks transferred by the slide over the dies and under the punches which are to perform the next operations, and Fig. 12 shows the punches operating upon the blanks.

When this machine is started in operation, the guide-plate is turned over end for end from the positions shown in Figs. 10, 11, and 12. As the strip passes through the lower groove of the guide-plate in this position the blanking-punch punches blanks from the middle of the strip. When the strip has been entirely punched through the middle, the guide-plate is turned over end for end and inserted in the position shown in Figs. 10, 11, and 12. The strip is then fed one way through the lower groove of the guide-plate, and the punch punches the blanks from one side of the middle between the middle perforations. In Fig. 4 the strip is shown as having had the middle row of punches completed and the punches on one side partly completed. After the blanks have been punched from one side of the middle, the reels are reversed and the strip is passed through in the opposite directions, so that without changing the guide-plate the blanks are punched from the other side of the middle. The reels are loose on their spindles and are alined by the passage of the strip through the guide-plate.

When the blanks are being punched from the middle, the feed-pawl engages the ratchet-wheel having the greater number of teeth. When the blanks are being punched from either side of the middle, the pawl is slipped along so as to engage the ratchet having the less number of teeth, so that the tendency will be to feed the strip a little farther; but, as explained, while the punchings are being made through the sides and the tendency is to feed the strip too far, the stop-finger engages the edge of one of the middle perforations, so that each side perforation is punched with the definite relation to the adjacent middle perforation. When the end of the strip is reached, the crank-rod between the crank and the slide operates the stop mechanism and shifts the belt so that the machine stops. The friction that is applied to the punch-lifting spindles controls them without materially increasing the load or causing wear on one side. There is no complicated mechanism required for shifting the strip, so as to punch the blanks in different lines, and as the side blanks are punched each with definite relation to the next middle perforation all of the punchings are perfect—that is, there is such a regulation of feed that none of the punchings will extend into the openings made by former punchings. The amount of downward movement of the punches is determined by adjusting the heads of the plungers, and the upward movement of the punches is determined and the amount of dwell governed by the shapes of the cams and the positions of the fingers on the spindles which are engaged by the cams. Additional spindles are applied to the machine when it is desired or necessary to perform further operations to get the eyelet into the required shape.

This machine is easily adjusted, the parts are simple to make and assemble, and the parts which are liable to wear are easily removed.

The invention claimed is—

1. An eyelet-machine having a frame, a die-bed with dies supported by the frame, punches supported by the frame above the dies, mechanism for reciprocating the punches, mechanism for feeding a strip between the blanking-die and punch, a reversible guide for guiding the strip over the blanking-die, and mechanism for transferring the blanks transversely from die to die, substantially as specified.

2. An eyelet-machine having a frame, a die-bed with dies supported by the frame, punches supported by the frame above the dies, mechanism for reciprocating the punches, mechanism for feeding a strip between the blanking-die and punch, a removable guide-plate having a groove in its upper face and a groove in its lower face for guiding the strip above the blanking-die, and mechanism for transferring the blanks transversely from die to die, substantially as specified.

3. An eyelet-machine having a frame, a die-bed with dies supported by the frame, punches supported by the frame above the dies, mechanism for reciprocating the punches, mechanism for feeding a strip between the blanking-die and punch, a removable guide-plate with oppositely-arranged grooves for guiding the strip above the blanking-die, a channel-plate for holding the guide-plate, a spring-plunger for retaining the guide-plate in the channel-plate, and mechanism for transferring the blanks transversely from die to die, substantially as specified.

4. An eyelet-machine having a frame, a die-bed with dies supported by the frame, punches supported by the frame above the dies, mechanism for reciprocating the punches, a spindle extending in front of the die-bed and a spindle extending back of the die-bed, reels having a longitudinal movement on the spindles, mechanism for feeding a strip from one reel to the other, a reversible plate for guiding the strip above the blanking-die, and means for transferring the blanks transversely from die to die, substantially as specified.

5. An eyelet-machine having a frame, a die-bed with dies supported by the frame, punches supported by the frame above the dies, mechanism for reciprocating the punches, reels supported in front of and back of the frame, feed-rolls adapted to draw a strip from one reel and pass it to the other reel, mechanism for rotating the feed-rolls, mechanism for winding the strip upon one reel, a reversible plate for guiding the strip over the blanking-die, and mechanism for transferring the blanks transversely from die to die, substantially as specified.

6. An eyelet-machine having a frame, a die-bed with dies supported by the frame, punches supported by the frame above the dies, mechanism for reciprocating the punches, a supply-reel located in front of the frame, a winding-reel located back of the frame, mechanism for drawing a strip from the supply-reel and passing it to the winding-reel, a pulley frictionally held to the spindle of the winding-reel, means for rotating the pulley, a plate for guiding the strip above the blanking-die, and means for transferring the blanks transversely from die to die, substantially as specified.

7. An eyelet-machine having a frame, a die-bed with dies supported by the frame, punches supported by the frame above the dies, mechanism for reciprocating the punches, feed-rolls for drawing a strip through the machine above the blanking-die, ratchets having a different number of teeth attached to the shaft of one of the feed-rolls, a pawl adapted to be engaged with either ratchet, mechanism for oscillating the pawl, a stop-finger adapted to be engaged by the walls of a perforation in the strip, and mechanism for transferring the blanks transversely from die to die, substantially as specified.

8. An eyelet-machine having a frame, a die-bed with dies supported by the frame, punches supported by the frame above the dies, mechanism for reciprocating the punches, a supply-reel located in front of the frame, a winding-reel located back of the frame, a plate for guiding the strip above the blanking-die, feed-rolls for drawing the strip from the supply-reel and passing it to the winding-reel, ratchets having a different number of teeth attached to the shaft of one of the feed-rolls, a pawl adapted to be engaged with either ratchet, mechanism for oscillating the pawl, and mechanism for transferring the blanks transversely from die to die, substantially as specified.

9. An eyelet-machine having a frame, a die-bed with dies supported by the frame, punches supported by the frame above the dies, mechanism for reciprocating the punches, feed-rolls for drawing a strip through the machine above the blanking-die, ratchets having a different number of teeth attached to the shaft of one of the feed-rolls, a pawl adapted to be engaged with either ratchet, a pawl-block supporting the pawl, mechanism for oscillating the pawl-block, a sleeve carried by the pawl-block and supporting the pawl-arbor, means for moving the sleeve with the pawl longitudinally of the pawl-block for moving the pawl from one ratchet to the other, and mechanism for transferring the blanks transversely from die to die, substantially as specified.

10. An eyelet-machine having a frame, a die-bed with dies supported by the frame, punches supported by the frame above the dies, mechanism for reciprocating the punches, a supply-reel located in front of the frame, a winding-reel located back of the frame, mechanism for winding a strip upon the winding-reel, a lubricating-box between the supply-reel and the blanking-die, a reversible plate for guiding the strip above the blanking-die, feed-rolls for drawing the metal through the guide-plate, ratchets having a different number of teeth secured to the shaft of one of the feed-rolls, a pawl-block bearing a pawl adapted to be engaged with either ratchet, mechanisms for oscillating the pawl-block, and mechanism for transferring the blanks transversely from die to die, substantially as specified.

11. An eyelet-machine having a die-bed holding a die, a channel-plate fastened to the die-bed above the die, a reversible guide-plate removably held in the channel-plate above the die, means for drawing a strip through the guide-plate, and a punch adapted to be reciprocated toward and from the die, substantially as specified.

12. An eyelet-machine having a die-bed with a die, a punch adapted to be reciprocated toward and from the die, feed-rolls for drawing a strip between the die and punch, the shaft of one of the feed-rolls bearing two ratchet-wheels having a different number of teeth, a pawl adapted to engage the teeth of either ratchet, mechanism for transferring the pawl from one ratchet to the other, and mechanism for oscillating the pawl, substantially as specified.

13. An eyelet-machine having a frame, a die-bed with dies supported by the frame, punches supported by the frame above the dies, mechanism for reciprocating the punches, mechanism for drawing a strip through the machine between the blanking-die and punch, mechanism for transferring the blanks transversely from die to die, an arm supported by the strip that is passing through the machine, out of the path of the transferring mechanism and adapted to be dropped into the path of the transferring mechanism when the end of the strip is reached, a catch connected with the arm, a trip-arm held by the catch, and a belt-shifter that is adapted to be thrown when the catch is released from the trip-arm for transferring the driving-belt from a fixed to a loose pulley, substantially as specified.

14. An eyelet-machine having a frame, a die-bed with dies supported by the frame, punches supported by the frame above the dies, mechanism for reciprocating the punches, mechanism for drawing a strip through the machine above the blanking-die, mechanism for transferring the blanks transversely from die to die, an arm supported by the strip that is passing through the machine, out of the path of the transferring mechanism and adapted to be engaged by the transferring mechanism when it is not supported by a strip, a catch connected with the arm, a trip-arm held by the catch, a belt-shifter, an arm connected with the trip-arm and connected with the belt-shifter, and a spring for throwing the belt-shifter and shifting the belt from a fixed to a loose pulley when the catch is released from the trip-arm, substantially as specified.

15. An eyelet-machine having mechanism for feeding a strip through the machine, mechanism for transferring the blanks transversely from die to die, a stop-arm held out of the path of the transfer mechanism when a strip is passing through the machine but dropping into the path of the transfer mechanism when a strip is not passing through the machine, and a belt-shifter that is thrown when the stop-arm is engaged by the transfer mechanism, substantially as specified.

16. An eyelet-machine having mechanism for feeding a strip through the machine, mechanism for transferring the blanks transversely from die to die, a stop-arm hinged upon a vertical shaft, a finger and roll adapted to hold the stop-arm out of the path of the transfer mechanism, when a strip of metal is passing through the machine, an arm on the vertical shaft, a catch connected with the arm, a vertical shaft bearing a trip-arm adapted to engage the catch and a shifter-arm, a spring tending to rotate the vertical shaft, and a belt-shifter adapted to be moved by the shifter-arm when the catch is released from the trip-arm, substantially as specified.

17. An eyelet-machine having a blanking die and punch, feed-rolls for drawing a strip between the blanking die and punch, two ratchet-wheels having a different number of teeth mounted on the shaft of one of the feed-rolls, a pawl adapted to engage with either ratchet, mechanism for moving the pawl into engagement with either ratchet, mechanism for oscillating the pawl, a friction-arm pivoted to the feed-roll frame and embracing the shaft of one of the feed-rolls, and means for tightening or loosening the grip of the friction-arm on the shaft of the feed-roll, substantially as specified.

18. An eyelet-machine having a frame, a die-bed with dies supported by the frame, punches supported by the frame above the dies, mechanism for reciprocating the punches, feed-rolls for drawing a strip through the machine above the blanking-die, two ratchets having a different number of teeth mounted on the shaft of one of the feed-rolls, a pawl adapted to engage either ratchet, mechanism for oscillating the pawl, a finger pivotally supported by the frame in line with one row of perforations in the strip, and mechanism for oscillating the finger into and out of the perforations, substantially as specified.

19. An eyelet-machine having a frame, a die-bed with dies supported by the frame, punches supported by the frame above the dies, mechanism for reciprocating the punches, feed-rolls for feeding a strip through the machine above the blanking-die, mechanism whereby the feed-rolls may be rotated at different speeds, a stop-finger hinged to the frame in line with one row of perforations in the strip, mechanism adapted to oscillate the stop-finger into and out of the perforations, and means whereby the height of the finger can be adjusted so that it may or may not oscillate into and out of the punchings in the strip, substantially as specified.

20. An eyelet-machine having an arbor supported by the frame, a stop-finger connected with the arbor in line with one row of perforations in the strip, an arm projecting from the arbor, a spindle extending through the end of the arm, a spring thrusting the arm against a collar on the spindle means whereby when the spindle is turned the arm is lifted or lowered, a plunger engaging the lower end of the spindle, and a cam adapted to lift the plunger, substantially as specified.

21. An eyelet-machine having an arbor supported by the frame, a stop-finger connected with the arbor in line with one row of perforations in the strip, an arm projecting from the arbor, a spindle extending through the end of the arm, a spring thrusting the arm against a collar on the spindle, means whereby when the spindle is turned the arm is lifted or lowered, a plunger engaging the lower end of the spindle, a cam adapted to lift the plunger, and a spring for drawing the plunger down, substantially as specified.

22. An eyelet-machine having a frame, a die-bed with dies supported by the frame, spindles extending upwardly into the dies, plungers supporting the spindles, cams for lifting the plungers, punches above the dies, mechanism for reciprocating the punches, mechanism for feeding a strip through the machine above the blanking-die, and mechanism for transferring the blanks transversely from die to die, substantially as specified.

23. An eyelet-machine having a frame, a die-bed with dies supported by the frame, spindles extending upwardly into the dies, plungers supporting the spindles, cams for lifting the plungers, pins thrusting against the plungers, springs thrusting the pins inwardly against the plungers, punches supported by the frame above the dies, mechanism for reciprocating the punches, mechanism for feeding a strip through the machine above the blanking-die, and mechanism for transferring the blanks transversely from die to die, substantially as specified.

24. An eyelet-machine having a frame, a bed with dies supported by the frame, punches supported by the frame above the dies, mechanism for reciprocating the punches, mechanism for feeding a strip through the machine above the blanking-die, a slide below the blanking-die and above the other dies, a crank and a crank-rod for reciprocating the slide, and spring-fingers mounted on the slide for grasping and transferring the blanks transversely from die to die, substantially as specified.

25. An eyelet-machine having a frame, a bed with dies supported by the frame, punches supported by the frame above the dies, mechanism for reciprocating the punches, feed mechanism for drawing a strip through the machine above the blanking-die, a reversible plate removably held above the blanking-die for guiding the strip through the machine, a slide movable below the blanking-die and above the other dies, a crank and crank-rod for reciprocating the slide, spring-fingers carried by the slide and adapted to grasp and transfer the blanks transversely from die to die, substantially as specified.

26. An eyelet-machine having a frame, a die-bed with dies supported by the frame, plungers supported by the frame above the dies, punches carried by the plungers, adjustable heads in the upper ends of the plungers, vertically-movable spindles supported by the frame, bars connecting the plungers and the spindles, arms adjustable with the spindles, cams engaging the heads for depressing the plungers, cams engaging the arms for lifting the spindles, mechanism for feeding a strip through the machine above the blanking-die, and mechanism for transferring the blanks transversely from die to die, substantially as specified.

27. An eyelet-machine having a frame, a bed with dies supported by the frame, plungers supported by the frame above the dies, punches carried by the plungers, adjustable heads in the upper ends of the plungers, spindles carried by the frame, bars connecting the plungers and the spindles, arms adjustably connected with the spindles, a friction-sleeve on each spindle held against movement longitudinally of the spindle but having a free movement transversely with relation to the spindle, cams engaging the heads for depressing the plungers, cams engaging the arms for lifting the spindles, and mechanism for feeding a strip through the machine above the blanking-die, substantially as specified.

28. An eyelet-machine having a frame, a bed with dies supported by the frame, punches supported by the frame above the dies, mechanism for reciprocating the punches, mechanism for feeding the strip through the machine above the blanking-die, a slide, a crank and crank-rod for reciprocating the slide, said slide having a recess for receiving the punched blank and spring-fingers adapted to transfer the blanks from die to die, substantially as specified.

29. A strip-feed for an eyelet-machine consisting of a pair of rolls with their shafts geared together, two ratchet-wheels mounted on the shaft of one roll, said ratchet-wheels having a different number of teeth, a pawl-block, a crank and connecting-rod for oscillating the pawl-block, a bushing longitudinally movable in the pawl-block, a spindle bearing a pawl held by the bushing, a handle extending from the bushing and adapted to move the bushing and the pawl longitudinally, and a spring adapted to hold the bushing-handle in notches in the pawl-block, substantially as specified.

30. An eyelet-machine, having a blanking-die, a guide-plate with offset grooves in its opposite faces above the blanking-die and adapted to be reversed so that the position of the guiding-groove may be changed with relation to the blanking-die, and a channel-plate holding the die and the guide-plate together, substantially as specified.

31. An eyelet-machine having dies, punches, mechanism for reciprocating the punches, mechanism for feeding a strip through the machine above the blanking-die, mechanism for transferring the blanks from die to die, a belt-shifter mechanism for throwing the belt-shifter, and mechanism for causing the trip to be released by the transfer mechanism when the end of a strip is reached, substantially as specified.

32. An eyelet-machine having mechanism for feeding a strip through the machine, reciprocating punches, a transferring-slide, and a die-bed containing adjustable dovetail die-blocks holding dies and plates extending over the ends of the die-blocks forming guides for the edges of the transferring-slide, substantially as specified.

33. An eyelet-machine having mechanism for feeding a strip through the machine, reciprocating punches, adjustable dies, a transferring-slide, a crank, mechanism for rotating the crank, and a crank-rod connecting the crank and the slide, the said crank-rod having a slot, one end wall of which is formed by an adjustable block that is held in position by a set-screw and that is prevented from movement endwise of the crank-rod by a wedge, substantially as specified.

34. An eyelet-machine having mechanism for feeding a strip through the machine, reciprocating punches, dies, a slide for transferring the blanks transversely from die to die, and a friction device for the slide consisting of a plate bearing upon the slide, plungers thrusting against the plate, a spring arranged to thrust the plungers against the plate and means for adjusting the tension of the spring, substantially as specified.

35. An eyelet-machine having mechanism for feeding a strip through the machine, a plate with a groove for guiding the strip, dies, punches, mechanism for reciprocating the punches, and mechanism for transferring the blanks transversely from die to die, substantially as specified.

36. An eyelet-machine having a frame, a die-bed with dies supported by the frame, punches supported by the frame above the dies, mechanism for reciprocating the punches, mechanism for feeding a strip between the blanking die and punch, a removable plate with a guiding-groove for guiding the strip over the blanking-die, and mechanism for transferring the blanks transversely from die to die, substantially as specified.

ANDREW C. CAMPBELL.

Witnesses:
   ANNA I. MONAGAN,
   E. B. LINCH.